United States Patent [19]
Yun

[11] Patent Number: 5,945,949
[45] Date of Patent: Aug. 31, 1999

[54] MOBILE STATION POSITION DETERMINATION IN A WIRELESS COMMUNICATION SYSTEM

[75] Inventor: Paul Munsang Yun, Lambertville, N.J.

[73] Assignee: Lucent Technologies Inc., Murray Hill, N.J.

[21] Appl. No.: 08/782,354

[22] Filed: Jan. 13, 1997

[51] Int. Cl.⁶ .............................. G01S 3/02; H04M 11/00
[52] U.S. Cl. ............................................. 342/457; 455/456
[58] Field of Search .................................... 342/387, 457, 342/463, 126; 455/456

[56] References Cited

U.S. PATENT DOCUMENTS

| | | | |
|---|---|---|---|
| 5,321,514 | 6/1994 | Martinez . | |
| 5,506,864 | 4/1996 | Schilling | 342/457 |
| 5,612,703 | 3/1997 | Mallinckrodt | 342/457 |
| 5,763,964 | 4/1998 | Ghosh et al. | 342/457 |

FOREIGN PATENT DOCUMENTS

| | | |
|---|---|---|
| 728327 | 4/1955 | United Kingdom . |
| 2221122 | 1/1990 | United Kingdom . |
| 2304500 | 11/1996 | United Kingdom . |
| WO 97/01228 | 1/1997 | WIPO . |

OTHER PUBLICATIONS

M. Wylie et al., "The Non–Line of Sight Problem in Mobile Location Estimation," ICUPC '95, Boston, MA, 1995.

J. Caffery et al., "Radio Location in Urban CDMA Microcells," Proceedings of PIMRC '95, pp. 858–862, IEEE, 1995.

*Primary Examiner*—Gregory C. Issing

[57] ABSTRACT

Methods and apparatus for determining mobile station position in a wireless communication system are disclosed. A mobile station of the wireless system includes a silent echo generation circuit which receives a transmit time stamp transmitted in a sync channel from a base station, and processes the transmit time stamp to generate a receive time stamp. The silent echo generation circuit transmits the receive time stamp back to the base station on a spurious-like echo carrier which is offset from a data carrier of the wireless system. The base station processes the transmit and receive time stamps to compute a first ranging value, receives corresponding second and third ranging values computed by two other system base stations which receive the echo carrier and its time stamp, and processes the first, second and third ranging values to determine a position vector indicative of the position of the mobile station. The base station then further processes the position vector to determine a bearing for the vector, and converts the result into latitude and longitude coordinates of the mobile station position. The silent echo generation circuit provides mobile position determination capability in the wireless system without significantly increasing the cost, size, weight and power consumption of the mobile station, without requiring a multilayer user interface, and without degrading system voice quality.

29 Claims, 3 Drawing Sheets

MOBILE STATION POSITION DETERMINATION IN A WIRELESS COMMUNICATION SYSTEM

FIELD OF THE INVENTION

The present invention relates generally to cellular, PCS and other wireless communication systems and more particularly to techniques for determining the position of a mobile telephone or other mobile communication station in such systems.

BACKGROUND OF THE INVENTION

Demand for wireless communication services, such as mobile telephones in cellular and Personal Communications Service (PCS) systems, is continually increasing. Meanwhile, the Global Positioning System (GPS) is gaining widespread acceptance in numerous commercial applications. GPS includes a network of satellites which permit users equipped with GPS receivers to determine their position anywhere in the world with a high degree of accuracy. Position determination is also an important issue in wireless communication systems, in that it is often desirable for the wireless system to determine the positions of mobile telephones or other types of mobile communication stations. A wireless system which is able to determine the position of a given mobile station in an efficient manner could provide an enhanced level of service to the user, while also generating additional revenue for a service provider.

As an example of the need for mobile position determination in a wireless system, consider a scenario in which a mobile telephone user is traveling on an unfamiliar highway. The mobile telephone user enters the highway and passes several exits in traveling toward a destination. The user then experiences car trouble, pulls the car off the road, and makes a call from the mobile telephone to an emergency road service. The user attempts to describe the location to the emergency service operator, but unfortunately does not remember the last exit number that was just passed on the highway. The user may therefore be forced to ask the police to conduct a wide area search in order to receive the road service. The feeling of frustration and helplessness experienced by the user would be compounded if the car trouble occurred late at night, in inclement weather or in a high-crime area.

The increasingly widespread use of both wireless systems and GPS receivers suggests that mobile position determination in a wireless system could be provided using the capabilities of GPS. A "brute force" approach to utilizing GPS functions to provide mobile position determination in a wireless system could involve simply integrating a conventional GPS receiver into each mobile station. However, this brute force approach unduly increases the cost, size, weight and power consumption of the mobile station, and is therefore not likely to be commercially viable. Similar simplistic approaches attempting to integrate various conventional GPS features into the mobile station may tend to require the introduction of complex, multilayer user interface functions, thereby undermining the efficiency of the wireless system. Unfortunately, there does not appear to be any currently available technique suitable for integrating GPS-like functions into a wireless system in a cost-effective manner and without degrading voice quality.

As is apparent from the above, a need exists for a mobile position determination technique which may be configured to utilize GPS-like functions, requires minimal additional mobile station and base station circuitry, does not require multilayer user interface functions, and does not degrade voice quality in the wireless system.

SUMMARY OF THE INVENTION

The present invention provides methods and apparatus for mobile position determination in a wireless communication system. In accordance with one aspect of the present invention, a mobile station of the wireless system includes a silent echo generation circuit (SEGC) which is initialized by a mobile user pressing a sequence of keys such as *EPS to access an Emergency Position Service. The SEGC then receives a first time information signal transmitted from a system base station. The first time information signal may be a transmit time stamp in the form of a universal time coordinate (UTC) transmitted by the base station via a forward link sync channel. The SEGC extracts the transmit time stamp from the sync channel and processes it to generate a receive time stamp which corresponds to an echo of the transmit time stamp. The receive time stamp is transmitted back to the base station on an echo carrier signal which is offset from a primary data carrier signal of the system. For example, if a primary data carrier of the system has a frequency Fc, the echo carrier signal may have a frequency such as Fc±1000 kHz. The modulated echo carrier signal may be implemented as a narrow band FM signal, a CDMA signal or any other type of signal capable of being modulated by a time stamp or other type of time information signal. The echo carrier signal power level is designed in accordance with the invention to satisfy the spurious signal specification of the system, such that voice quality on the primary data channel is not degraded due to the presence of the echo carrier signal.

In accordance with another aspect of the invention, a first base station of the wireless system is equipped with a silent echo signal receiver and a processor. The first base station generates the above-noted transmit time stamp and transmits it to the SEGC of the mobile station in the forward link sync channel. The silent echo signal receiver of the first base station receives the echo carrier signal from the mobile station, and demodulates it to recover the receive time stamp. The first base station uses the transmit and receive time stamps to compute a first ranging value, and also receives corresponding second and third ranging values computed in second and third base stations, respectively, of the wireless system. The second and third base stations are time-synchronized with the first base station and in proximity to the mobile station, and can therefore generate the respective second and third ranging values using the receive time stamp transmitted on the echo carrier signal from the mobile station. The computation of a ranging value in a given base station may involve measuring a time difference between the transmit time stamp and the receive time stamp received by the given base station, and correcting the result for internal delays of the mobile station and the given base station. The processor of the first base station processes the first, second and third ranging values to generate a position vector and bearing indicative of mobile station position. The bearing determination may involve setting boundary limits and sign conventions for directional antennas of the first base station, converting the first, second and third ranging values, and identifying a majority of sign agreements. The resulting vector and bearing may be converted to latitude and longitude coordinates for the mobile station, and used to retrieve maps, directions or other useful information from a database for subsequent transmission to the mobile user.

The present invention thus integrates features comparable to those found in a GPS receiver into the mobile stations and base stations of a wireless system. The result is a cost-effective implementation which does not unduly increase the cost, size, weight and power consumption of the mobile station, does not require multilayer user interface functions, and does not degrade voice quality. These and other features and advantages of the present invention will become more apparent from the accompanying drawings and the following detailed description.

DETAILED DESCRIPTION OF THE INVENTION

The present invention will be illustrated below in conjunction with an exemplary frequency band of an IS-95 wireless communication system. It should be understood, however, that the invention is not limited to use with any particular type of system, but is instead more generally applicable to any wireless system in which it is desirable to provide cost-effective mobile position determination without substantially increasing the cost, size, weight and power consumption of the mobile station. For example, although the techniques are illustrated with reference to frequency band A of the IS-95 code division multiple access (CDMA) personal communications service (PCS) system, it will be apparent to those skilled in the art that the techniques are also applicable to CDMA cellular systems, as well as analog and time division multiple access (TDMA) systems. The term "forward link" as used herein refers generally to the base-to-mobile transmission channels and the term "reverse link" refers generally to the mobile-to-base transmission channels. The term "transmit time stamp" as used herein is intended to include any time information signal transmitted from a base station to a mobile station, such as a universal time coordinate (UTC) transmitted in a forward link sync channel. The term "receive time stamp" as used herein is intended to include any time information signal, such as a gated time stamp, which is generated by a mobile station and may be used by a base station in a mobile position search algorithm (MPSA).

A wireless communication system in accordance with the present invention is capable of determining the mobile station position without degrading voice quality, requiring the addition of multilayer user interface functions to the mobile station, or increasing the physical size, weight and power consumption of the mobile station. A quantitative set of system requirements will be provided in the context of the exemplary IS-95 CDMA PCS system described in greater detail in TIA/EIA/IS-95A, "Mobile Station-Base Station Compatibility for Dual-Mode Wideband Spread Spectrum Cellular System," Jun. 1996, TIA/EIA/IS-97A, "Recommended Minimum Performance Standards for Base Station Supporting Dual-Mode Wideband Spread Spectrum Cellular Mobile Stations," June 1996, and TIA/EIA/IS-98A, "Recommended Minimum Performance Standards for Dual-Mode Wideband Spread Spectrum Cellular Mobile Stations," June 1996, all of which are incorporated by reference herein.

Figure 1:
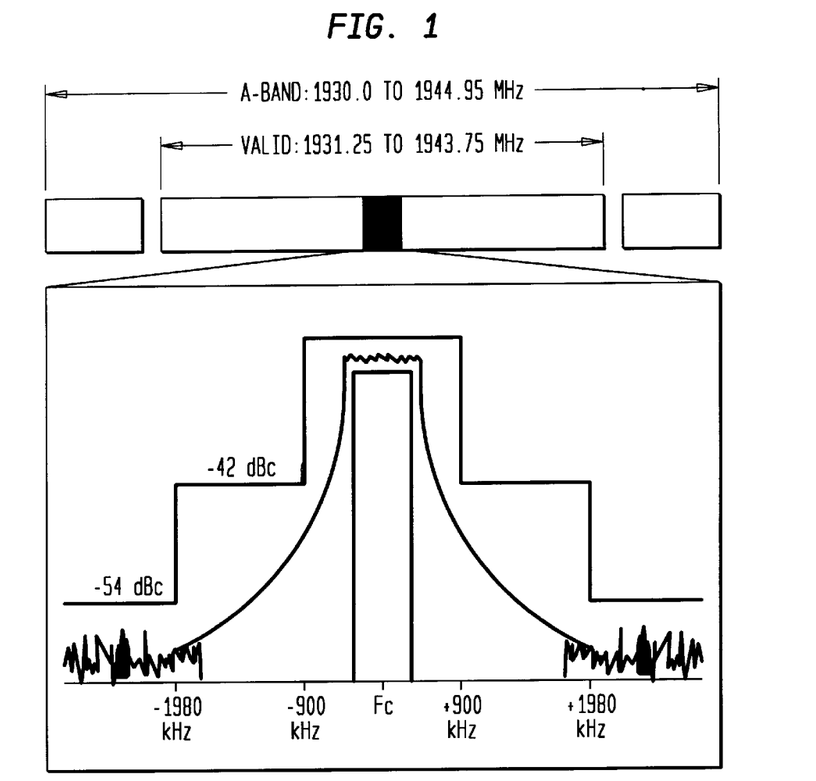
FIG. 1 illustrates the frequencies and in-band spurious signal requirements of frequency band A of the IS-95 CDMA PCS frequency plan.

FIG. 1 shows the frequency spectrum allocation and in-band spurious signal requirement for the CDMA PCS A-Band base station transmit frequencies. It can be seen from FIG. 1 that the PCS A-band occupies a frequency range from 1930.0 to 1944.95 MHZ, with the portion from 1931.25 to 1943.75 considered valid. The A-Band includes 300 channels in its total bandwidth of about 15 MHZ, but the valid frequencies are those corresponding to channel numbers 25 through 275, in the valid portion from 1931.25 MHZ to 1943.75 MHZ. Part of the valid portion is expanded in FIG. 1 to illustrate the spurious signal requirements in the vicinity of the carrier frequency Fc. The requirements indicate that the spurious signals should be 42 dB below the carrier within the frequency band Fc−1980 kHz<f<Fc−900 kHz, Fc+900 kHz<f<Fc+1980 kHz, and 54 dB below the carrier for frequencies f<Fc−1980 kHz, f>Fc+1980 kHz.

A mobile station in accordance with the IS-95 CDMA standard uses the reverse link access channel to initiate and establish conventional communication with a base station, and to respond to paging channel messages of the forward link. As will be described in greater detail below, the present invention may be implemented by incorporating a silent echo generation circuit (SEGC) into a mobile station of a wireless system. When activated by a mobile user, the SEGC produces a spurious-like silent echo signal which is transmitted to the base stations in the reverse link access channel offset from the CDMA carrier by about±1000 kHz. The SEGC of the present invention modulates a gated time stamp onto the silent echo signal. The present invention thus embeds a time stamp in the access channel or elsewhere in the reverse link to provide an echo of the conventional forward link sync channel such that the base station can perform ranging computations to determine the mobile station position. The base stations are designed to receive the silent echo signal and to perform ranging computations using the embedded time stamp to thereby determine the position of the corresponding mobile station. The silent echo signal is generated in such a manner that it does not violate the above-described spurious signal requirements of the IS-95 PCS A-band. The SEGC can be implemented in either a radio frequency (RF) or baseband (BB) section of an otherwise conventional mobile station.

An exemplary specification for a system in accordance with the invention will now be described. The IS-95 standard specifies that the CDMA PCS bandwidth is 1.228 MHZ, such that the chip rate is about 814 ns. A CDMA chip timing resolution of 200 ns, which corresponds to about one-fourth of the chip rate, will therefore generally provide sufficient margin for ranging. The silent echo signal generated by the SEGC should be less than −50 dBc between the frequencies in the range Fc−1980 kHz<f<Fc−900 kHz and Fc+900 kHz<f<Fc+1980 kHz, in order to provide sufficient margin over the spurious signal requirements specified in the above-cited IS-95A and IS-98A documents. The exemplary system specification may be summarized as follows:

SEGC carrier: Fc±1000 kHz

SEGC spurious: −50 dBc/30 kHz for Fc−1980 kHz<f<Fc−900 kHz and Fc+900 kHz<f<Fc+1980 kHz.

Timing resolution: 200 ns

Position accuracy: ±100 feet (rms)

Frame error rate: 2% (max)

Response delay: <100 ns

Autonomous mobile user position finder, by pressing predetermined keys such as *EPS No significant interference with other users No significant increase of mobile unit size, weight and power consumption No new multilayer user interface No degradation of voice quality The above-cited IS-95A document defines the operation of a mobile station in the CDMA PCS system. The mobile station commences operation by entering an initialization state, searching for and acquiring the pilot channel, and obtaining the system configuration parameters such as the protocol, paging channel data rate, and network and system identifications. The mobile station decodes system timing information that includes pseudorandom number (PN) offset, system time in the form of universal time coordinates (UTC), and a long code state from the sync channel. After acquiring the sync channel, the mobile station enters an idle state to acquire and monitor the paging channel which includes a CDMA channel list, a neighbor list, access parameters, and paging messages. The mobile station then enters an access state to perform origination, registration, and page response functions before entering a traffic state for full duplex voice communications.

It should be noted that a CDMA PCS system with position search in accordance with the present invention may be configured to utilize the access channel of the reverse link and either the pilot, sync or paging channels of the forward link to implement a ranging function based on the above-described silent echo signal. This arrangement avoids disturbing the traffic channels and thereby ensures that voice quality is maintained. The pilot channel of the forward link may be undesirable in that it has to be an unmodulated carrier to comply with the IS-95A standard. The frame formats of the sync and paging channels include fields that can be adjusted for application-specific control, status, and data rates. The sync appears to be better structured than the paging channel for implementing the forward link portion of the SEGC and MPSA of the present invention.

Figure 2:
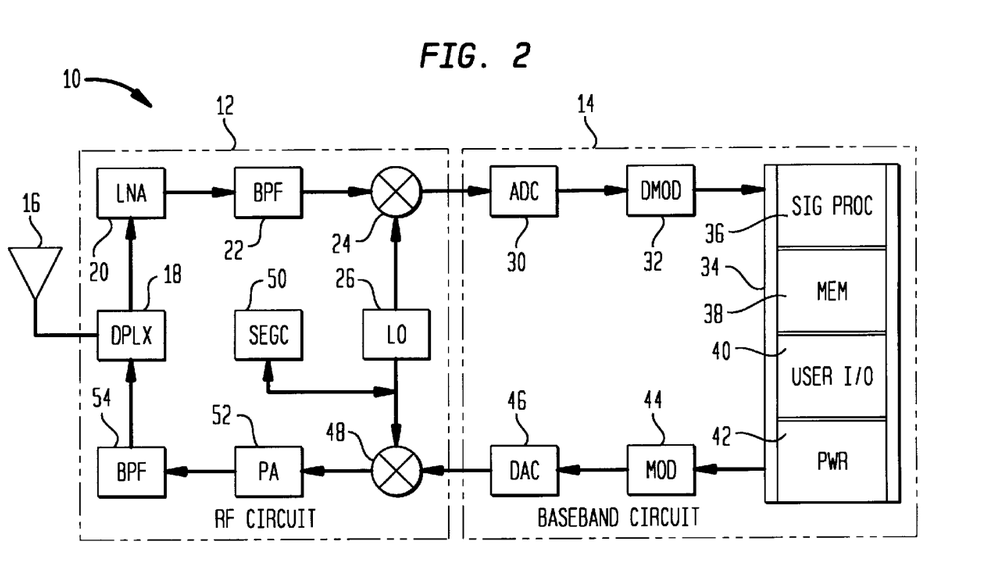
FIG. 2 is a block diagram of an exemplary mobile station configured in accordance with an exemplary embodiment of the present invention.

FIG. 2 shows a block diagram of a mobile station configured in accordance with an exemplary embodiment of the invention. The mobile station 10 includes an RF circuit 12 and a BB circuit 14. An antenna 16 is used to receive signals from and transmit signals to a base station. An RF signal $r_m(t)$ received from the antenna 16 is directed by a diplexer filter 18 to a low noise amplifier (LNA) 20. The amplified received signal $r_m(t)$ from LNA 20 is filtered in a band pass filter (BPF) 22 to eliminate undesirable sideband and spurious signals, and then applied to an input of a mixer 24. The mixer 24 mixes $r_m(t)$ with a signal from the local oscillator (LO) 26 to thereby downconvert $r_m(t)$ to an intermediate frequency. The resulting downconverted signal is applied to an analog-to-digital converter (ADC), and then to a baseband demodulator 32. The received data from the baseband demodulator 32 is applied to baseband processing unit 34 which includes a signal processor 36, a memory 38, user I/O circuitry 40 and a power source 42. The received data is processed in a conventional manner and supplied to the mobile user via user I/O circuitry 40.

Data is transmitted from the mobile station 10 to a base station in the following manner. The data is supplied from the baseband processing unit 34 to the input of a baseband modulator 44. The baseband modulator 44 modulates the transmission data and applies the modulated data to a digital-to-analog converter (DAC) 46 which generates an intermediate frequency signal suitable for application to a mixer 48. The mixer 48 upconverts the intermediate frequency signal by mixing it with the LO signal supplied from LO 26. In accordance with the invention, an SEGC 50 in the RF circuit 12 receives the LO signal from LO 26 and generates a spurious-like silent echo signal modulated by a gated time stamp. As noted above, the gated time stamp corresponds to an echo of a sync signal transmitted from a given base station to the mobile station 10. The silent echo signal passes through the mixer 48 and falls at a frequency of about Fc±1000 kHz. Although the silent echo signal from SEGC 50 passes through mixer 48 in the illustrative embodiment, in other embodiments it may be mixed with the transmission data signal applied to the mixer IF input port. The upconverted output of the mixer 48 is amplified in a power amplifier (PA) 52, filtered in BPF 54 and then delivered via diplexer filter 18 to the antenna 16 for transmission to a base station in the reverse link access channel. Other alternative embodiments may supply the silent echo signal directly to the PA 52, the BPF 54 or the diplexer 18 in FIG. 2, although such embodiments may require additional frequency conversion circuitry which could increase the size, weight and power consumption of the mobile station.

An RF signal $r_b(t)$ transmitted by the mobile station 10 and received in a given base station will now be described in greater detail. The signal $r_b(t)$ received at the base station is generally a composite of several carriers with randomly-varying amplitude and phase as a function of time due to multipath-induced fading, and can be modeled by the following equation:

$$r_b(t) = \sum_i A_i(t)\cos[\omega_i + \phi_i(t)] \quad (1)$$

in which $A_i(t)$ is the time-varying amplitude, $\omega_i$ is the carrier center frequency, and $\phi_i$ is the time varying phase. For simplicity of description, the multipath environment will be disregarded and a simple case of single-carrier reception will be considered. The index i terms in Equation (1) are therefore dropped, and the signal $r_b(t)$ received at the base station can be written as:

$$r_b(t) = A(t)\cos[\omega_0 t + \phi(t)] \quad (2)$$

The received signal $r_b(t)$ is downconverted by mixing it with an LO signal similar to that generated by LO 26 of the mobile station 10. In the case of a CDMA waveform, the frequency terms in Equations (1) and (2) will generally include the quadriphase pseudorandom sequence [PN(i) and PN(q)] and orthogonal subcarriers [cosωt and sinωt], and the data portion will be encoded in accordance with the above-cited IS-95A standard using convolutional encoding, block interleaving and Walsh encoding. The base station receiving $r_b(t)$ may utilize coherent detection, in which the received signal $r_b(t)$ is applied to a pair of quadriphase mixers which multiply $r_b(t)$ with cosωt for in-phase (I) and sinωt for quadrature-phase (Q). Applying a trigonometric identity to Equation (2) yields:

$$r_b(t) = A(t)[\cos \omega_0 t \cos \phi(t) - \sin \omega_0 t \sin \phi(t)] \quad (3)$$

Let $A(t)=1$, $\cos\phi(t)=I(t)$ and $\sin\phi(t)+Q(t)$. Equation (3) multiplied by the orthogonal subcarriers cosωt and sinωt will then produce the outputs $Y_i(t)$ and $Y_q(t)$, which can be expressed as:

$$Y_i(t) = \frac{I(t)}{2} + \frac{I(t)}{2}\cos 2\omega_0 t - \frac{I(t)}{2}\sin 2\omega_0 t \quad (4)$$

$$Y_q(t) = \frac{Q(t)}{2} + \frac{Q(t)}{2}\cos 2\omega_0 t - \frac{Q(t)}{2}\sin 2\omega_0 t \quad (5)$$

The second and third terms of Equations (4) and (5) may be filtered by a suitable bandpass filter. The signals Yi(t) and Yq(t) are then passed through a correlator which performs an autocorrelation function by integrating the signals for a symbol period T, as illustrated in Equations (6) and (7) below.

$$C_{ii} = \frac{1}{N}\sum_{n+0}^{N-0} Y_i(n)Y_i(n+m) \quad (6)$$

$$C_{qq} = \frac{1}{N}\sum_{n+0}^{N-1} Y_q(n)Y_q(n+m) \quad (7)$$

A discrete Fourier transform of Equations (6) and (7) may be taken to obtain the power spectral density of the corresponding signals. A system base station which may be configured to provide the above-described processing operations for the received signal $r_b(t)$ will be described in greater detail in conjunction with FIG. 6 below.

As noted above, this exemplary embodiment of the present invention places a spurious-like silent echo signal in the frequency band Fc−1980 kHz<f<Fc−900 kHz, Fc+900 kHz<f<Fc+1980 kHz at an adjusted power of about −50 dBc in a 30 kHz bandwidth. The silent echo signal may be placed about ±1000 kHz away from the center of the carrier frequency Fc, and may be implemented using, for example, a narrow band frequency modulation (FM) technique, a wide band CDMA technique or other suitable modulation techniques. Although the use of a wide band CDMA implementation can completely eliminate the need for new mobile station hardware in this example by reusing the existing mobile station CDMA hardware, it may require modification of the access channel protocol and data format. In applications in which interoperability and compatibility with other service providers must be maintained, it will generally be desirable to avoid modifying the access channel protocol and data format. Keeping the access protocol and data format unchanged may also make it unnecessary to go through approval cycles with a standards committee, thereby shortening product development time. The exemplary embodiment to be described below will therefore implement the SEGC using additional hardware to produce a narrow band FM silent echo signal located about 1000 kHz away from the CDMA carrier frequency Fc.

Figure 3A:
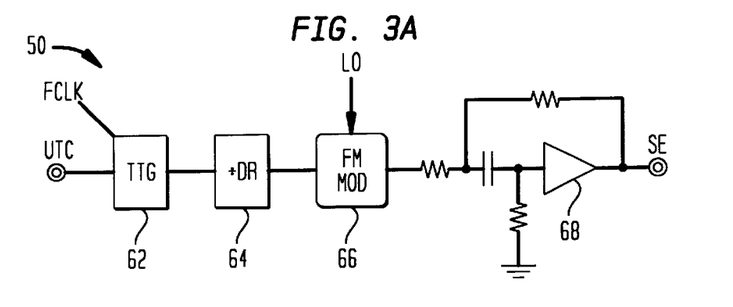
FIGS. 3A and 3B illustrate an exemplary silent echo generation circuit (SEGC) suitable for use in the mobile station of FIG. 2 in accordance with the invention.
Figure 3B:
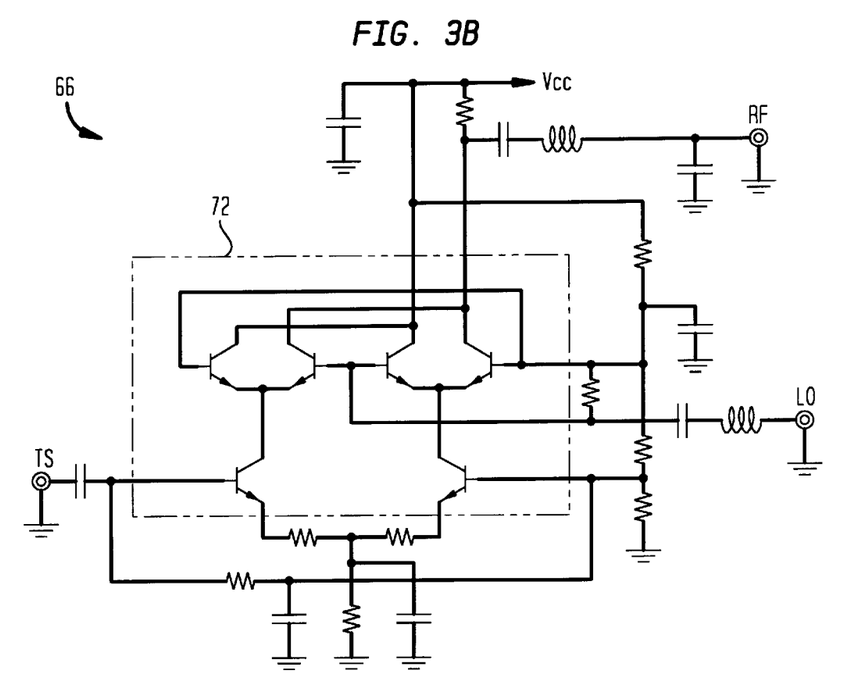

FIGS. 3A and 3B illustrate an exemplary SEGC 50 which generates a narrow band FM silent echo signal having a bandwidth of about 30 kHz. FIG. 3A shows an SEGC circuit 50 which generates a time stamp modulated by a gated pulse, and modulates the gated time stamp onto a narrow band FM carrier located about 1000 kHz from the CDMA carrier frequency Fc to thereby provide the silent echo signal. The output of the SEGC 50 appears similar to a spurious-like FM signal, but one which satisfies the IS-95A spurious signal specification and carries a gated time stamp corresponding to an echo of the forward link sync signal and suitable for use in performing ranging computations to determine mobile position. FIG. 3B shows a narrowband FM modulator 66 suitable for use in the exemplary SEGC 50. The FM modulator 66 of FIG. 3B is implemented using a Gilbert cell 72 and a relatively small number of passive elements, such that it produces only a negligible increase in mobile station size, weight and power consumption.

The SEGC 50 is initialized by the mobile station 10 decoding the forward link sync channel and extracting the universal time code (UTC) field. The extracted UTC field is applied to a time tag generator (TTG) 62 and gated with the access channel frame clock (FCLK) at 50 Hz to generate a coarse time stamp. A coarse resolution in seconds will generally not be accurate enough to provide the desired mobile position ranging resolution. The coarse time stamp from the TTG 62 is therefore divided by the desired resolution (DR) in a divider circuit 64. In this embodiment, a time stamp resolution of 100 ns is used to meet the above-noted ranging requirement. The internal path delay attributable to the SEGC 50 and other mobile station circuitry should be added to the time stamp prior to its modulation onto a carrier in FM modulator 66. For example, if the desired resolution of a given time stamp is 100 ns, the corresponding output should be 100 ns+Δt, where Δt represents the internal path delay. The internal path delay measurements may be based on a statistical mean value for a particular sample of mobile stations in a given system. These internal path delay corrections may be provided using a suitably configured register, delay line or software process within divider circuit 64 or elsewhere in SEGC 50. The resulting gated time stamp TS is applied to the conventional Gilbert cell 72 in the narrow band FM modulator 66 of SEGC 50, as shown in FIG. 3B. The Gilbert cell 72 of FIG. 3B and the external elements associated therewith operate from a supply voltage Vcc and modulate the gated time stamp TS onto a narrowband RF carrier with a frequency of Fc±1000 kHz and a power level of about −50 dBc. The Gilbert cell 72 in modulator 66 utilizes an LO received from the LO 26 of the RF circuit 12 of FIG. 2. The operation of the Gilbert cell and its associated circuitry is well known in the art and will not be described in detail herein. It should also be apparent that numerous alternative modulation techniques and circuits could also be used to provide the desired spurious-like silent echo signal modulated by a gated time stamp.

Figure 4A:
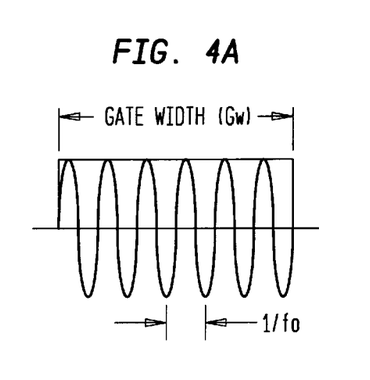
FIGS. 4A and 4B show an exemplary gated receive time stamp and its corresponding power spectral density in accordance with the invention.
Figure 4B:
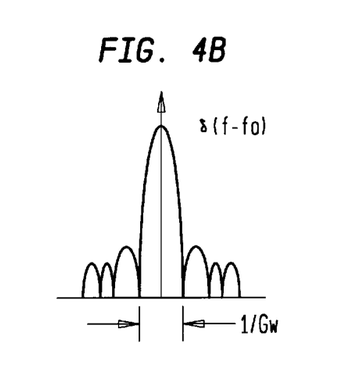

FIGS. 4A and 4B show graphical representations of an exemplary gated time stamp and its corresponding power spectral density, respectively, as modulated onto the RF silent echo carrier. The gated time stamp has a gate width Gw corresponding to the width of the time stamp TS modulating the narrowband FM carrier in the modulator 66 of FIG. 3. The gate width Gw of time stamp TS in this exemplary embodiment is about 1/30 kHz or 33.33 μsec. The period of the time stamp carrier is 1/fo where fo corresponds to the FM carrier frequency of modulator 66. The corresponding power spectral density has a main lobe width of 1/Gw which is about 30 kHz in this exemplary embodiment. It should be noted that the time stamp signal characteristics of FIGS. 4A and 4B are exemplary only, and that a number of alternative arrangements for providing the position determination features of the present invention will be apparent to those of ordinary skill in the art.

The following pseudocode illustrates the initialization of the SEGC 50 in accordance with the present invention. The mobile position determination is referred to as an "Emergency Position Service" or EPS and may be initiated by a mobile user entering a predetermined keystroke sequence, such as *EPS, at the mobile station.

```
/* Start Emergency Position Service */
Do SEGC_initialization
    User enters *EPS
    Set SEGC carrier to Fc + 1000 kHz
    Set power amplifier gain to minimum
    Set access channel message field for EPS
End Do
Do SEGC_processing
    Decode sync channel to extract UTC
    Gate UTC using access frame clock of 50 Hz
    Get system timing resolution
    Add internal processing delay time
    Transfer data to access frame
    Insert predefined message length followed by the time tag message
    Perform cyclic redundancy decoding CRC-30
    Transmit until terminated
End Do
/* End Initialization of the SEGC */
```

It can be seen from the above pseudocode that after the mobile station user presses *EPS, the SEGC carrier is set to Fc+1000 kHz, the gain of power amplifier 52 is set to its minimum value, and the reverse link access channel field is set to include a predetermined EPS message. Although the gain of power amplifier 52 is initially set at its minimum value, it may be subsequently raised above its minimum value if, for example, the mobile station is in a poor coverage region. After this initialization, the sync channel is decoded to extract the UTC, and the UTC is applied to the TTG 62 of the SEGC 50 and gated using the 50 Hz access frame clock to produce a coarse time stamp. The system timing resolution is then retrieved from a suitable storage location such as memory 38, the coarse gated time stamp is divided down to provide the desired ranging resolution, and the internal delay time of the SEGC circuitry is added to the result to produce a gated time stamp suitable for modulation onto the SEGC RF carrier. Conventional access data is then transferred to the access frame along with a predefined message length and time tag message, and CRC-30 processing is performed on the access frame. The access frame is transmitted by the mobile station 10 until an access termination indication is received from the base station. These and other operations of the reverse link access channel are described in greater detail in the above-cited IS-95A reference. The silent echo signal including a gated time stamp is then transmitted from the mobile station as previously described.

The operation of the base stations in a wireless system in accordance with the invention will now be described in greater detail. The system base stations are designed to determine mobile position by receiving and processing the above-described silent echo signal generated by the SEGC 50. As noted previously, the silent echo signal may be transmitted from a given mobile station to a base station using the access channel of the reverse link. Table 1 shows the access channel reverse link budget. It is assumed for this example that the body loss is about 2 dB and the signal loss between the power amplifier 52 and the antenna 16 in the mobile station 10 is negligible, such that the effective isotropically-radiated power (EIRP) of the mobile station is 21 dBm. The example will also assume a fade margin of about 10 dB, a soft handoff gain of 3 dB, a receiver interference margin of 5 dB induced by other users within the cell boundary, and an in-vehicle penetration loss of 5 dB. The fade margin value used in this example represents an estimated lognormal distribution of 1.3σ for slow fading and shadowing effects in an urban multipath environment. The net channel effect is therefore −17 dB. The base stations will be assumed to include generic directional receive antennas which provide 17 dBi gain, with a 65° horizontal beam width and a 6.5° vertical beam width. The loss attributable to connectors and cable is about 3 dB. The net base station gain before the low noise amplifier is therefore 14 dB. The thermal noise in the access channel data bandwidth of 4.8 kHz is assumed to be −137.2 dBm. The base station noise figure (NF) and Eb/No are both assumed to be 7 dB. The base station receiver sensitivity is therefore −123.2 dBm. In this example, the total reverse link path loss $P_{l(rvs)}$ is 141.2 dB. This means that the reverse link can be closed as long as the mobile station stays within coverage boundaries that do not exceed 141.2 dB of loss caused by distance and environment. The total reverse link path loss $P_{l(rvs)}$ is given by the following equation:

$$P_{l(rvs)} = EIRP_{ms} + CH_{eff} + G_{bs} - RS_{bs} \qquad (8)$$

in which $EIRP_{ms}$ is the mobile station EIRP, $Ch_{eff}$ is the net channel effect, $G_{bs}$ is the base station gain and $RS_{bs}$ is the base station receiver sensitivity. The access channel reverse link budget analysis is summarized in Table 1 below.

TABLE 1

Access Channel Reverse Link Budget Analysis

| Parameters | Specifications | Notes |
|---|---|---|
| (A) MS Tx Power | 23.0 dBm | = 200 mW |
| (B) MS Ant Gain | 0 dBi | |
| (C) Body Loss | 2 dB | |
| (D) MS EIRP | 21 dBm | D = A + B − C |
| (E) Fade Margin | 10 dB | |
| (F) Soft HO Gain | 3 dB | |
| (G) Rx Intf Margin | 5 dB | |
| (H) In-vehicle Loss | 5 dB | |
| (I) Net CH Effect | 17 dBi | I = E − F − G − H |
| (J) BS Ant Gain | 17 dBi | |
| (K) BS CC Loss | 3 dB | |
| (L) BS Net Gain | 14 dB | L = J − K |
| (M) kBT | −137.2 dBm/4.8 kHz | = −174 dBm/Hz |
| (N) BS Noise Figure | 7 dB | |
| (O) BS Eb/No | 7dB | |
| (P) BS Rx Sen | −123.2 dBm | P = M + N + O |
| (Q) Rev Link Path Loss | 141.2 dB | Q = D + I + L − P |

A given base station will include an silent echo receiver which may have a band pass filter, low noise amplifier, downconverter and demodulator suitable for receiving the spurious-like silent echo signal generated by a mobile station in the manner described above. Within the conventional CDMA bandwidth of about 1.23 MHZ, the base station receiver noise is mainly influenced by base-to-base co-channel interference from neighboring base stations. However, within the narrow SEGC bandwidth of about 30 kHz, the reception of the injected silent echo signal will be primarily influenced by the system thermal noise because it is unlikely that other users will be operating near Fc±1000 kHz. The noise floor of the base station receiver will be assumed to be −129.2 dBm. The required carrier to noise power density ratio per Hz ($C/N_0$) is about 12 dB and includes thermal noise power plus other noise power such as man-made noise and base-to-base co-channel interference. For this example, it will be assumed that noise powers other than the system noise power are negligible. The required base station receiver sensitivity for this example is given by:

$$R_{sens} = N_f + NF + \frac{C}{N_0} \quad (9)$$

in which $N_f$ is the noise floor within the 30 kHz silent echo signal bandwidth and NF is the system noise figure. Applying Equation (9) to the above-noted values of $N_f$, NF and ($C/N_0$) yields a base station receiver sensitivity of −110.2 dBm.

Figure 5:
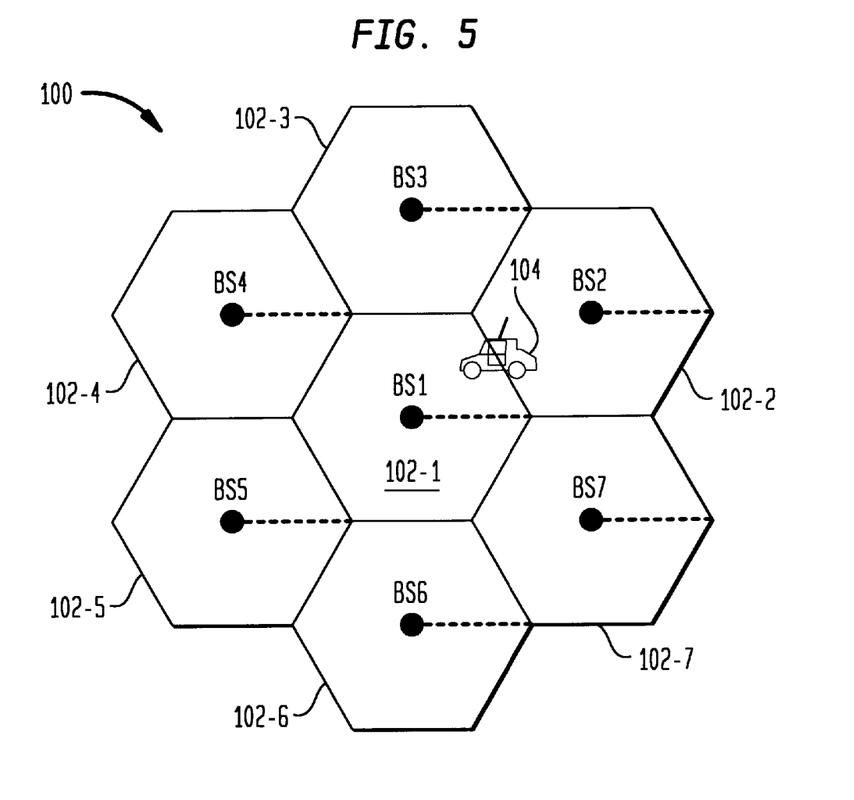
FIG. 5 shows a portion of a wireless communication system illustrating the operation of a mobile position search algorithm (MPSA) in accordance with the invention.

FIG. 5 shows a portion of a wireless communication system 100 with cells 102-i, i=1, 2, 3 . . . 7 arranged in a seven-cell hexagonal pattern. This illustrative embodiment of a motion position search in accordance with the invention is based on a two-dimensional geometry in which each of the cells 102-i includes three 120° sectors. It should be understood that the invention may also be implemented using a three-dimensional geometry at the expense of increased range computing time. In this example, it will be assumed without limitation that the mobile station 104 is traveling at the intersection of cells 102-1, 102-2 and 102-3. The corresponding base stations BS1, BS2 and BS3 of these cells can use a mobile position search algorithm (MPSA) similar to that used by conventional GPS receivers. One such algorithm may involve the use of a variant of the following equations:

$$r1 = \sqrt{(x_1 - x_0)^2 + (y_1 - y_0)^2 + (z_1 - z_0)^2}$$
$$r2 = \sqrt{(x_2 - x_0)^2 + (y_2 - y_0)^2 + (z_2 - z_0)^2}$$
$$r3 = \sqrt{(x_3 - x_0)^2 + (y_3 - y_0)^2 + (z_3 - z_0)^2}$$

where the subscripts 1, 2, and 3 represent respective base stations BS1, BS2 and BS3 and their corresponding position parameters, the subscript 0 represents the mobile station position parameters, and the variables r1, r2 and r3 represent pseudo range values. Pseudo range values can be calculated by accurately tracking the silent echo signal RF carrier frequency, measuring phase differences and multiplying by the speed of light c. In this example, the base stations are stationary and can provide precise timing and position parameter information. The base stations therefore may determine the mobile position by measuring time delay between transmitted and received time stamps, and then vectoring the results to determine the position of the mobile station. The base stations can thus simultaneously measure the ranges of the mobile station to calculate the mobile position. The calculated mobile position may be converted to latitude and longitude coordinates and used in conjunction with a base station database to provide details of maps, relative directions and other useful position data to the mobile user. The mobile station range to be computed at a given base stations can be expressed as:

$$R = [T(rx) - T(tx) - dt(ms) - dT(bs)]/c$$

where T(tx) is the transmit time stamp transmitted from the base station to the mobile station over the forward link sync channel, T(rx) is the receive time stamp received on the silent echo signal transmitted from the mobile station to the base station, dT(ms) is the delay in the mobile station circuitry, and dT(bs) is the delay in the base station circuitry.

The following pseudocode illustrates an exemplary embodiment of a mobile position search technique performed by base stations BS1, BS2 and BS3 of respective cells 102-1, 102-2 and 102-3 to locate mobile station 104 in the system of FIG. 5.

```
/* Start Mobile Position Search */
Do MPSA initialization
    Synchronize time in base stations BS1, BS2 and BS3
    Set desired resolution for time stamps
    Turn the silent echo signal receiver on
    Store the measured internal time delay
    Calibrate the base station circuitry by built-in-test
    Set access channel message field for EPS
End Do
Do Ranging Resolution
    Set BS1 as master BS2 and BS3 as slaves
        Measure R1 and store:
            R1 = [T1(rx) − T(tx) − dT(ms) − dT(bs)]/c
        Get measured R2 from BS2 and store:
            R2 = [T2(rx) − T(tx) − dT(ms) − dT(bs)]/c
            Subtract line delay between BS1 and BS2
        Get measured R3 from B53 and store:
            R3 = [T3(rx) − T(tx) − dT(ms) − dT(bs)]/c
            Subtract line delay between BS1 and BS3
```

-continued

```
    Vector the measured ranges R1, R2 and R3 and store
  EndDo
  Do Bearing Resolution
    Set Ref_bearing to azimuth of each base station antenna sector
    Set each sector boundary_limit to +/− 60 degrees
    Set sign; CW=Plus, CCW=Minus
      Convert R1 to rectangular coordinates
        X1 = R1 cos θ, Y1 = R1 sin θ
      Convert R2 to rectangular coordinates
        X2 = R2 cos θ, Y2 = R2 sin θ
      Convert R3 to rectangular coordinates
        X3 = R3 cos θ, Y3 = R3 sin θ
      Vote for 2 of 3 sign agreements
      Convert the position to Lat/Long and store
  End Do
  Do Data Conversion
    Get Lat/Long of mobile station
    Overlay it onto a map database
    Find nearest intersection
    Compile data and transmit to mobile station
  End Data Conversion
  Continue until acknowledgment received from the mobile station
  If acknowledged, End process
  /* End Mobile Position Search */
```

In the above pseudocode, the three base stations BS1, BS2 and BS3 synchronize themselves, determine an appropriate resolution for the time stamps, turn on their silent echo signal receivers, store the measured internal time delay, calibrate the base station circuitry, and set the access channel message to indicate EPS. The ranging resolution process then begins, with one of the three base stations designated as a master and the other two as slaves. In this example, base station BS1 is designated the master and base stations BS2 and BS3 are slaves. The base station BS1 measures R1 in accordance with the above equation by sending a transmit time stamp T(tx) to the mobile station in the sync channel, receiving a receive time stamp T1(rx) via the silent echo signal sent by the mobile station in the reverse link access channel, correcting for the mobile station and base station internal circuitry delays, and dividing the result by the speed of light c. The base stations BS2 and BS3 perform similar measurements to generate R2 and R3 using their respective receive time stamps T2(rx) and T3(rx) received via the silent echo signal in their respective reverse link access channels. The base station BS1 stores R1, receives and stores R2 from base station BS2, receives and stores R3 from base station BS3, subtracts the BS2-to-BS1 line delay from R2, subtracts the BS3-to-BS1 line delay from R3, and uses the results to generate and store a vector indicative of mobile position.

The base station BS1 then determines the bearing of the vector. This initially involves setting the reference bearing to the azimuth of each of the three 120° directional antennas, setting the sector boundary limit to ±60°, and establishing a sign convention of clockwise (CW) relative to azimuth as plus and counter-clockwise relative to azimuth as minus. BS1 then converts the R1, R2 and R3 values in accordance with the above equations, and establishes the bearing based on a minimum of 2 out of 3 sign agreements. After the vector and bearing have been determined, the results are converted to latitude/longitude values and stored. BS1 may then perform additional data conversion by, for example, retrieving the latitude/longitude position of the mobile station, overlaying it on a portion of a map retrieved from a map database, locating the nearest intersection, compiling the map and intersection data and transmitting it in a suitable format to the mobile station. The base station BS1 may continue the process until an acknowledgment is received from the mobile station.

Figure 6:
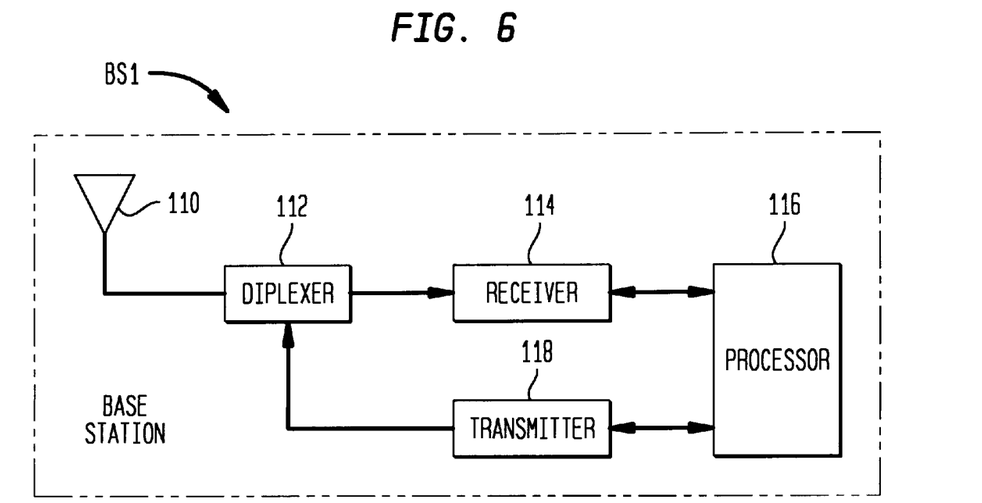
FIG. 6 shows an exemplary base station in accordance with the invention.

FIG. 6 shows an exemplary base station BS1 in accordance with the invention. The base station BS1 includes an antenna 110 which receives the above-described signal $r_b(t)$ from a particular mobile station 10. The signal $r_b(t)$ includes the spurious-like silent echo signal generated in SEGC 50 of FIG. 2. The received signal is directed by a diplexer filter 112 to an input of a receiver 114 which may implement coherent detection of the signal $r_b(t)$ as described above in conjunction with Equations (1) through (7). The detected signal including the detected time stamp are supplied to a base station processor which implements the processing steps described in the above pseudocode to determine the position of the mobile station. The base station BS1 includes a transmitter 118 which operates in conjunction with the processor 116 to generate signals for transmission to the mobile station via antenna 110 as required for implementing the MPSA described above.

The present invention utilizes a silent echo signal to provide GPS-like position determination features in a PCS, cellular or other type of wireless cellular system without significantly increasing the cost, size, weight and power consumption of the mobile station, without adding new multilayer interfaces and without degrading the voice quality of the wireless system. The system base stations can be readily reconfigured to receive and process the silent echo signal and thereby determine mobile position. It should be noted that the above-described exemplary MPSA can be expanded in a straightforward manner to account for fading caused by a multipath environment, provided the wireless system can accommodate real time processing of delay spread and statistical analyses for calculating received signal strength.

The above-described embodiments of the invention are intended to be illustrative only. Numerous alternative embodiments may be devised by those skilled in the art without departing from the scope of the following claims.

Acronyms
BS—Base Station
BPF—Band Pass Filter
CDMA—Code Division Multiple Access
EIRP—Effective Isotropically Radiated Power
GPS—Global Positioning System
LNA—Low Noise Amplifier
LO—Local Oscillator
MPSA—Mobile Position Search Algorithm
MS—Mobile Station
PCS—Personal Communications Service
PN—Pseudo-Random Number
RFM—Radio Frequency Module
SEGC—Silent Echo Generation Circuit
TDMA—Time Division Multiple Access
UTC—Universal Time Coordinates

What is claimed is:

1. A method of determining the position of a mobile station in a wireless communications system, the method comprising the steps of:

receiving a first time information signal from a base station of the wireless system;

processing the first time information signal in the mobile station to generate a second time information signal; and transmitting the second time information signal to the system base station using a low-power offset carrier signal, offset in frequency from a mobile-to-base data carrier signal of the system, and having a substantially lower power level than the data carrier signal, wherein the base station utilizes the first and second time information signals in conjunction with range information received from at least one other system base station to determine the position of the mobile station.

2. The method of claim 1 wherein the offset carrier signal has a power level less than or equal to a maximum spurious signal power level requirement of the wireless communication system.

3. The method of claim 1 wherein the step of transmitting the second time information signal to a system base station further includes the step of modulating the second time information signal onto the offset carrier signal to generate a narrow band FM signal.

4. The method of claim 1 wherein the step of transmitting the second time information signal to a system base station further includes the step of modulating the second time information signal onto the offset carrier signal to generate a CDMA signal.

5. The method of claim 1 wherein the first time information signal corresponds to a transmit time stamp generated by the base station and transmitted to the mobile station via a sync channel.

6. The method of claim 1 wherein the step of processing the first time information signal to generate the second time information signal further includes the steps of:
  extracting a time coordinate from the first time information signal;
  gating the time coordinate using a mobile station clock signal to thereby generate a coarse time stamp;
  dividing the coarse time stamp down to a desired ranging resolution to thereby generate a higher resolution time stamp; and
  adding an internal delay correction factor to the higher resolution time stamp to thereby generate the second time information signal.

7. The method of claim 6 wherein the step of gating the time coordinate using a mobile station clock signal further includes the step of gating the time coordinate using an access channel frame clock.

8. A mobile station suitable for use in a wireless communications system having a mobile position determination capability, the mobile station comprising:
  a receiver for receiving a first time information signal from a base station of the wireless system; and
  an offset carrier generation circuit having an input connected to receive the first time information signal from the receiver, wherein the generation circuit is operative to process the first time information signal to generate a second time information signal and to transmit the second time information signal to the system base station using a low-power offset carrier signal, offset in frequency from a mobile-to-base data carrier signal of the system, and having a substantially lower power level than the data carrier signal, such that the base station utilizes the first and second time information signals in conjunction with range information received from at least one other system base station to determine the position of the mobile station.

9. The mobile station of claim 8 wherein the offset carrier signal has a power level less than or equal to a maximum spurious signal power level requirement of the wireless communication system.

10. The mobile station of claim 8 wherein the generation circuit is operative to transmit the second time information signal to a system base station by modulating the second time information signal onto the offset carrier signal to generate a narrow band FM signal.

11. The mobile station of claim 8 wherein the generation circuit is operative to transmit the second time information signal to a system base station by modulating the second time information signal onto the offset carrier signal to generate a CDMA signal.

12. The mobile station of claim 8 wherein the first time information signal corresponds to a transmit time stamp generated by the base station and transmitted to the mobile station via a sync channel.

13. The mobile station of claim 8 wherein the generation circuit further includes:
  a time tag generator circuit for gating a time coordinate extracted from the first time information signal to thereby generate a coarse time stamp; and
  a divider circuit for dividing the coarse time stamp down to a desired ranging resolution to thereby generate a higher resolution time stamp.

14. The mobile station of claim 13 wherein the time tag generator circuit gates the time coordinate extracted from the first time information signal using an access channel frame clock of the mobile station.

15. A method of determining the position of a mobile station in a wireless communications system, the method comprising the steps of:
  transmitting a first time information signal from a first base station of the wireless systems;
  receiving in the first base station a second time information signal generated by the mobile station in response to the first information signal, wherein the second time information signal is transmitted from the mobile station to the first base station using a low-power offset carrier signal, offset in frequency from a mobile-to-base data carrier signal of the system and having a substantially lower power level than the data carrier signal; and
  processing the first and second time information signals in the first base station in conjunction with range information received from at least one other system base station to determine the position of the mobile station.

16. The method of claim 15 wherein the offset carrier signal is transmitted to the first base station at a power level less than or equal to a maximum spurious signal power level requirement of the wireless communication system.

17. The method of claim 15 wherein the first time information signal corresponds to a transmit time stamp generated by the first base station and transmitted to the mobile station via a sync channel.

18. The method of claim 15 wherein the step of processing the first and second time information signals in the first base station to thereby determine the position of the mobile station further includes the steps of:
  synchronizing time in the first base station with time in second and third base stations of the wireless system;

computing a first ranging value in the first base station using a transmit time stamp transmitted as part of the first time information signal from the first base station to the mobile station and a receive time stamp transmitted on the offset carrier signal from the mobile station to the first base station;

receiving corresponding second and third ranging values computed in the second and third base stations, respectively; and processing the first, second and third ranging values to generate a position vector indicative of mobile station position.

19. The method of claim 18 wherein the step of computing a first ranging value in the first base station further includes the steps of measuring a time difference between the transmit time stamp and the receive time stamp, and correcting the result for internal delays of the mobile station and the first base station.

20. A base station suitable for use in a wireless communications system having a mobile position determination capability, the base station comprising:

a transmitter for transmitting a first time information signal to a mobile station of the wireless system;

a receiver for receiving a second time information signal generated by the mobile station in response to the first information signal, wherein the second time information signal is transmitted from the mobile station to the base station using low-power offset carrier signal, offset in frequency from a mobile-to-base data carrier signal of the system and having a substantially lower power level than the data carrier signal; and a processor for processing the first and second time information signals in conjunction with range information received from at least one other system base station to determine the position of the mobile station.

21. The base station of claim 20 wherein the offset carrier signal has a power level less than or equal to a maximum spurious signal power level requirement of the wireless communication system.

22. The base station of claim 20 wherein the first time information signal corresponds to a transmit time stamp generated by the base station and transmitted to the mobile station via a sync channel.

23. The base station of claim 20 wherein the base station processor is further operative to synchronize time in the base station with time in second and third base stations of the wireless system, to compute a first ranging value using a transmit time stamp transmitted as part of the first time information signal to the mobile station and a receive time stamp transmitted on the offset carrier signal from the mobile station, to receive corresponding second and third ranging values computed in the second and third base stations, respectively, and to process the first, second and third ranging values to generate a position vector indicative of mobile station position.

24. The base station of claim 23 wherein the processor is operative to compute a first ranging value in the base station by measuring a time difference between the transmit time stamp and the receive time stamp, and correcting the result for internal delays of the mobile station and the base station.

25. A wireless communication system having a mobile position determination capability, the system comprising:

at least one mobile station; and a plurality of base stations including at least first, second and third base stations;

the first base station including a transmitter for transmitting a first time information signal to the mobile station, a receiver in the first base station for receiving a second time information signal generated by the mobile station in response to the first information signal, wherein the second time information signal is transmitted from the mobile station to the first base station using a low-power offset carrier signal, offset in frequency from a mobile-to-base data carrier signal of the system and having a substantially lower power level than the data carrier signal, and a processor for processing the first and second time information signals in the base station in conjunction with range information received from at least one other system base station to determine the position of the mobile station.

26. The system of claim 25 wherein the offset carrier signal has a power level less than or equal to a maximum spurious signal power level requirement of the wireless communication system.

27. The system of claim 25 wherein the first time information signal corresponds to a transmit time stamp generated by the first base station and transmitted to the mobile station via a sync channel.

28. The system of claim 25 wherein the first base station processor is further operative to synchronize time in the first base station with time in second and third base stations of the wireless system, to compute a first ranging value using a transmit time stamp transmitted as part of the first time information signal to the mobile station and a receive time stamp transmitted on the offset carrier signal from the mobile station, to receive corresponding second and third ranging values computed in the second and third base stations, respectively, and to process the first, second and third ranging values to generate a position vector indicative of mobile station position.

29. The system of claim 28 wherein the processor computes the first ranging value in the first base station by measuring a time difference between the transmit time stamp and the receive time stamp, and corrects the result for internal delays of the mobile station and the first base station.

* * * * *